United States Patent
Avasarala et al.

(10) Patent No.: US 12,413,406 B2
(45) Date of Patent: Sep. 9, 2025

(54) DYNAMIC CRYPTOGRAPHIC KEY MANAGEMENT FOR CACHED DATA

(71) Applicant: Dell Products L.P., Round Rock, TX (US)

(72) Inventors: Niharika Avasarala, Cupertino, CA (US); Mahadev Karadigudda, San Jose, CA (US); Nitin Madan, Cupertino, CA (US); Madhu Agrahara Gopalakrishna, Fremont, CA (US)

(73) Assignee: Dell Products, L.P., Round Rock, TX (US)

( * ) Notice: Subject to any disclaimer, the term of this patent is extended or adjusted under 35 U.S.C. 154(b) by 304 days.

(21) Appl. No.: 17/575,386

(22) Filed: Jan. 13, 2022

(65) Prior Publication Data
US 2023/0224153 A1 Jul. 13, 2023

(51) Int. Cl.
*G06F 21/64* (2013.01)
*G06F 21/62* (2013.01)
*H04L 9/08* (2006.01)
*H04L 9/32* (2006.01)

(52) U.S. Cl.
CPC ........ *H04L 9/0891* (2013.01); *G06F 21/6218* (2013.01); *G06F 21/64* (2013.01); *H04L 9/0894* (2013.01); *H04L 9/3239* (2013.01)

(58) Field of Classification Search
CPC ...... G06F 21/60; G06F 21/62; G06F 21/6218; G06F 21/64; H04L 9/08; H04L 9/91; H04L 9/0894; H04L 9/32; H04L 9/3236; H04L 9/3239
See application file for complete search history.

(56) References Cited

U.S. PATENT DOCUMENTS

| | | | | |
|---|---|---|---|---|
| 2006/0190724 A1* | 8/2006 | Adams | ..................... | G06F 21/71 713/166 |
| 2013/0086394 A1* | 4/2013 | Shimmitsu | .............. | G06F 3/061 713/193 |
| 2013/0326233 A1* | 12/2013 | Tolfmans | ................ | G06F 21/79 713/189 |
| 2014/0003608 A1* | 1/2014 | MacMillan | ........... | H04L 9/3239 380/279 |
| 2014/0304473 A1* | 10/2014 | Zachariassen | ...... | G06F 12/0811 711/122 |
| 2018/0145829 A1* | 5/2018 | Choi | ...................... | H04L 9/0631 |
| 2019/0103959 A1* | 4/2019 | Roake | ................... | H04L 9/0643 |
| 2019/0227951 A1* | 7/2019 | Durham | .................. | G06F 21/79 |
| 2022/0100652 A1* | 3/2022 | Liu | ..................... | G06F 16/2329 |
| 2022/0326867 A1* | 10/2022 | Thakkar | .............. | G06F 12/0253 |

\* cited by examiner

*Primary Examiner* — D'Arcy Winston Straub
(74) *Attorney, Agent, or Firm* — Staniford Tomita LLP

(57) ABSTRACT

Embodiments of a cryptographic key management system for cached data that abstracts key management details from the cache tier to the active tier and encryption process by encrypting data from the active tier using an encryption process employing an encryption key to generate an encrypted data block, and associating an encryption header with the encrypted data block, the encryption header including a key identifier as an index to the encryption key, where the encryption key is accessed through a key table maintained in the active tier. The system stores the encrypted data block in a cache tier, and decrypts the encrypted data block in the cache tier by providing the key identifier in the encryption header to the encryption process.

20 Claims, 7 Drawing Sheets

300

Keys 306

| K1 | K2 | K3 | | | |

CACHE TIER 302

- - - - - - - - - - - - - - - - - - - - - - - - -

ACTIVE TIER 304

Key #   Key Data

Key Table 308

| 01 | |
| 02 | |
| 03 | |
|    | |

FIG. 3

DYNAMIC CRYPTOGRAPHIC KEY MANAGEMENT FOR CACHED DATA

TECHNICAL FIELD

Embodiments relate generally to data encryption, and more particularly to cryptographic key management for cached data and metadata.

BACKGROUND OF THE INVENTION

With the increasing need to secure data access in data storage systems, it is necessary to ensure that data is secure throughout its lifecycle from on-disk storage to in-memory access. It is also necessary to ensure that sensitive user data, cached data and metadata (persistent media) is encrypted and secure to prevent any unwanted access or theft of such data.

Data caching is the predominant mechanism in data storage systems for enhanced performance in cases where frequently accessed data is stored on different storage drives with different access speeds. It is important in such cases to ensure that data is stored securely in all possible types and forms of data storage. Current key-based encryption systems encode the data such that it can only be accessed or decrypted by a user with the correct encryption key. Key-based encryption can be symmetric where one secret key is used to both encode and decode the data, or asymmetric where encryption key is done using a public key and decryption is done using a private key.

Present data deduplication storage systems (e.g., DellEMC Data Domain systems) generally do not support key-based encryption and decryption of data and metadata stored in cache volumes. Encryption and decryption of cache volume data and metadata can impose great management requirements and processing overhead on the cache layer if the cache layer must also manage all the cryptographic artefacts and key management needed to secure the data.

What is needed, therefore, is a cryptographic key management scheme for cache systems to secure the cached data without imposing onerous key management or key lifecycle requirements. What is further needed is a key management system in which data storage layers are agnostic as to key-state, key-type, and other cryptographic key management attributes.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, and Data Domain Restorer are trademarks of Dell EMC Corporation.

BRIEF DESCRIPTION OF THE DRAWINGS

In the following drawings, like reference numerals designate like structural elements. Although the figures depict various examples, the one or more embodiments and implementations described herein are not limited to the examples depicted in the figures.

FIG. 3 illustrates the use of a key table for a cryptographic key management process, under some embodiments.

DETAILED DESCRIPTION

Figure 1:
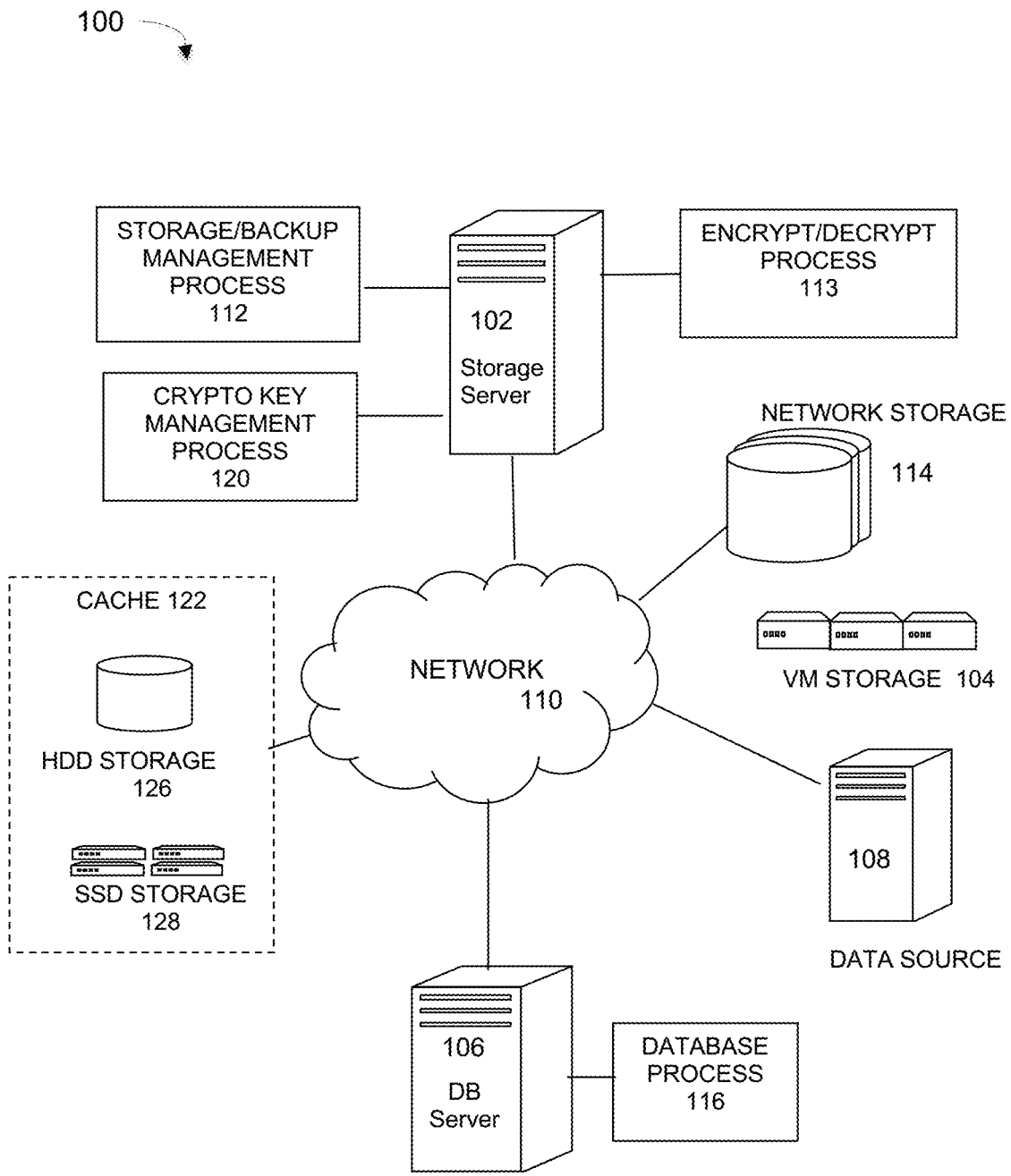
FIG. 1 is a diagram of a computing network implementing a dynamic cryptographic key management system for cached data, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software and systems deployed in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

As stated above, data caching is a predominant mechanism in data storage systems for enhanced performance in cases where frequently accessed data is stored on different storage drives with different access speeds. It is important in such cases to ensure that data is stored securely in all possible types and forms of data storage. To overcome the present issues of storage systems that do not support key-based encryption and decryption of data and metadata stored in cache volumes, embodiments include mechanisms that avoid cache layer handling key-state transitions while still supporting certain requirements of data transition in cases of compromised or destroyed keys. Such embodiments include systems and methods for the cache volume to securely encrypt and decrypt cache data agnostic of underlying cryptographic key characteristics. The cryptographic management module uses different techniques to make key management opaque to the cache layer and consistent across multiple types of data storage layers.

FIG. 1 illustrates a networked data storage system that implements one or more embodiments of a dynamic and agnostic key management process for cached data and metadata, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source maybe a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

Data Domain is an example of a purpose-built backup appliance providing streaming deduplication that is able to ingest data at full network speeds, from multiple backup sources while providing storage efficiency. Present Data Domain systems are able to use tiered data storage technologies, such as very large multi-terabyte SATA drive trays, or SSD-enabled fast ingest trays. Such data storage devices can thus range from legacy tape-based systems to a variety of hard disk devices (HDD) using various interfaces, as well as newer and much faster solid state SSD memory. The use of these different types of storage devices in an overall system imposes the need to manage multiple storage layers as part of an overall backup and recovery process. Certain characteristics such as access times, device life spans, storage volatility, and so on, can vary significantly between device types. For example, SSD storage is much faster than HDD devices, but has a shorter lifespan, is more expensive, and is typically not readily available in the same high and mega-scale capacities as HDDs. When such devices are used in time and mission-critical operations, such as data caching, these differences must be managed to ensure optimum cache efficiency.

The data backup process 112 makes extensive use of caches to enhance performance in cases where frequently accessed data is stored on different storage drives (e.g., tape, hard disk, solid state drives, etc.) with different access speeds. As shown in FIG. 1, a generalized cache 122 can comprise a number of different storage devices and types of storage devices, such as HDD storage 126 and SSD storage 128. It is important to ensure that data is stored securely in all forms of data storage from those with high access speeds (e.g., SSDs) to lower speed devices (e.g., tape, HDDs). In layered file system architectures, data at rest may be prefetched (in decrypted form) and re-encrypted in the cache layer 122. This re-encryption may be performed with a separate encryption key. As stated previously, encryption and decryption of cache volume data and metadata can be onerous on the cache layer if the cache layer must also manage all the cryptographic artifacts and key management needed to secure the data.

Encryption keys used for encrypting data at rest are rotated at cadence to ensure that large amounts of data are not dependent on a single encryption key, which creates the risk of a single point of failure when securing data at rest. Data encryption process 113 is handled by a dedicated cryptographic key management module 120 that ensures that key rotation is handled seamlessly with ongoing data ingest and restore operations. Module 120 also handles the various intricacies of data encryption key-state transitions and key compromised workflows to provide dynamic cache data management for every key-state flow. In general data 'at rest' refers to data that is stored in persistent storage (e.g., hard disk) of an active tier as user data. Other types of data include cached data, and data in transit.

Embodiments of the cryptographic key management module also manage different key rotation workflows based on the type of key-manager being used. This includes handling the case where a data encryption key is compromised. In present systems, handling a compromised data encryption key is an involved process where the entire data set in the system must be scanned to find all the relevant data dependent on that compromised key. All relevant data must then be re-encrypted with a new secure key in the system and only after all data dependencies on the compromised key are handled, can the compromised key then be deleted from the system.

A key can become compromised due to a variety of reasons or acts. For example, a compromised key can result from the unauthorized disclosure of a key so that all data encrypted by that key could be accessed by unauthorized parties. The integrity of a key could be compromised by invalid modification or substitution so that the key could be used for the wrong purpose or for the wrong application. The key's association with the owner could be compromised so that the identity of the other party cannot be assured or the data cannot be properly decrypted. Finally, the key's association with other information can be compromised so that the key is not associated with any data or the wrong data.

In an embodiment, the cryptographic key management system is used in a data storage system that implements a deduplication backup process, such as a Dell EMC Data Domain (DD) system. The Data Domain File System (DDFS) is an inline data deduplication file system. As data gets written to the file system, DDFS breaks it into variable sized segments and a group of segments are packed in a compression region. A number of compression regions are grouped together and written as a container to disk. DDFS calculates fingerprint signatures for each segment using SHA 1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In a deduplicated file-system that forms segments from data, these segments are uniquely identified by their key/label called as fingerprint. Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

Such processes make extensive use of cache memory (e.g., cache 122) to temporarily store the most recent or most used data being backed up or restored by process 112. The cached data may comprise actual data (content) or metadata, and will generally be referred to collectively as the cached or cache data.

The cryptographic management module 120 provides abstract interfaces to cache layers in the data storage system to encrypt and decrypt cache data or metadata units. Process 120 is configured to enable the data encryption key-management system to consistently manage data encryption keys across multiple types of workloads and multiple types of storage disks/layers in the data storage system without a need to switch between key-managers or algorithms for every subsystem that is encrypting data in the stack.

Figure 2:
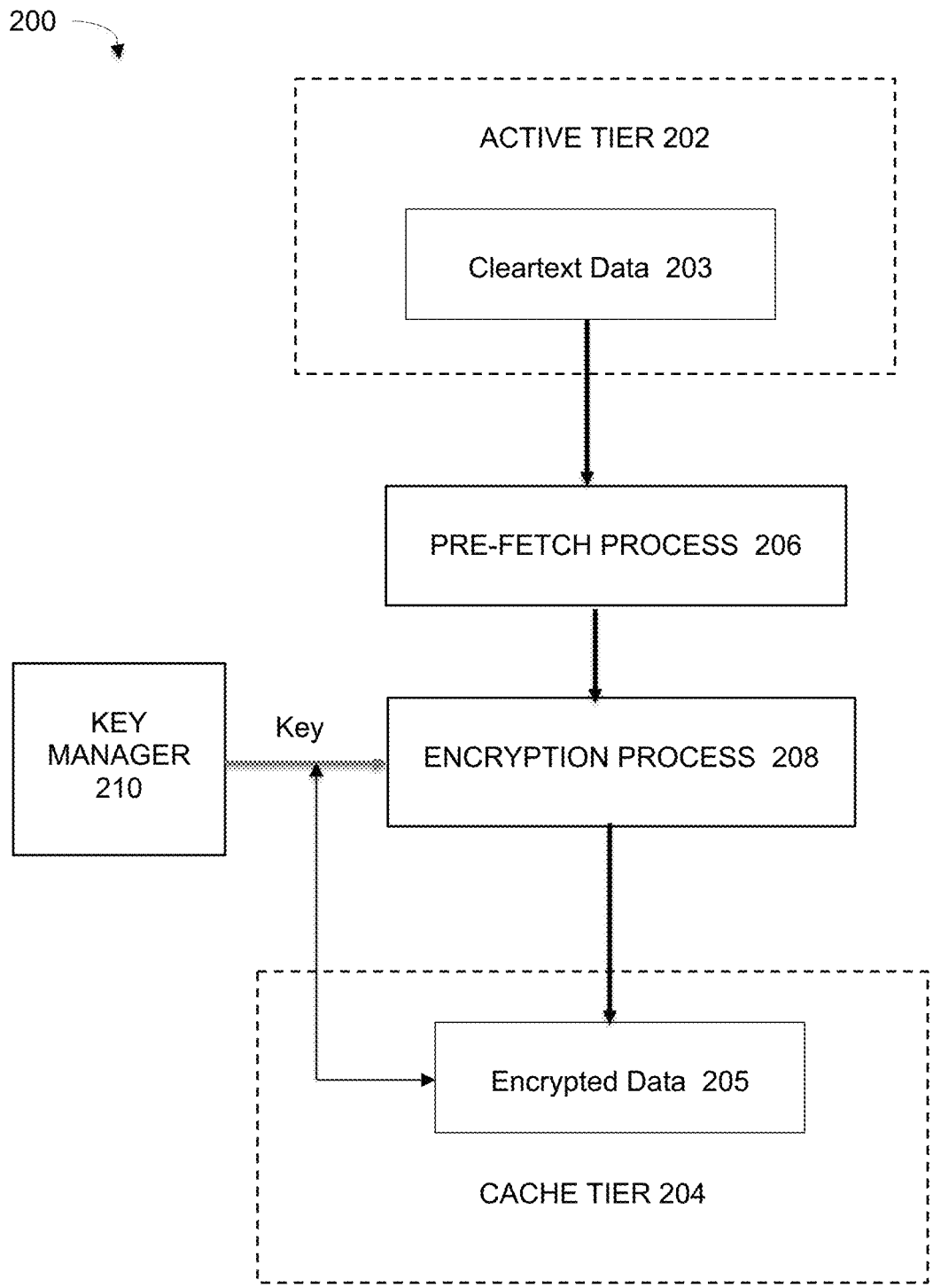
FIG. 2 illustrates the implementation of the cryptographic key management process between storage layers, under some embodiments.

In an embodiment, the cryptographic key management process 120 is used between the active tier and cache tier of a data storage system. FIG. 2 illustrates the implementation of the cryptographic key management process between storage layers, under some embodiments. As shown in system 200 of FIG. 2, the active tier 202 that represents the disk-based storage for applications, and the cache tier represents the fast, but limited (and expensive) memory used for temporary storage of most recent or most used data that is provided to the applications with as little input/output (I/O) latency as possible. A pre-fetch process 206 populates the cache 204 from the active tier 202 for data that satisfies the caching algorithms so that read requests from an application are served quickly from the cache rather than disk storage for appropriate data and metadata elements. This allows I/Os to be processed as fast as possible for processed datasets. Data that is not used as frequently or as recently as other data is evicted from the cache in accordance with cache flushing algorithms to ensure that the cache is always populated with the most relevant data and/or metadata.

For the embodiment of FIG. 2, data is provided from the active tier 202 as cleartext (non-encrypted) data 203. It is then encrypted by encryption process 208 using a key provided by the key manager process 210. This results in encrypted data 205 being stored in the cache tier 204. This system thus provides a level of encryption on the cache tier, which is in marked contrast to present systems that do not provide any encryption at all in the cache tier.

In an embodiment, a key table is maintained in the active tier to keep track of keys used in the cache tier. FIG. 3 illustrates the use of a key table for a cryptographic key management process, under some embodiments. As shown in diagram 300 of FIG. 3, the cache tier 302 utilizes a number of encryption keys 306 denoted keys K1, K2, . . . Kn, for successive keys as they are rotated/updated over time by the key manager 210. The active tier 304 maintains a key table 308 that has corresponding entries for each of the keys. A cache data/metadata block header (described below in reference to FIG. 4) includes key data comprising encryption algorithm, key attributes, initialization vector used for encryption, and the length of the encrypted block. For every block of data, the block header points to the corresponding key in key table 308 through the key number index to manage the keys 306 in the active tier. This active management can comprise initiating keys, putting keys in a pre-active state, moving keys an active state, de-activating keys, marking keys as compromised/destroyed status, and so on. The key management process can use any appropriate number of states to designate the current status of each of the keys.

System 200 yields a cache system that provides encryption in the cache tier that is essentially agnostic to any key management system. The key can be generated by a local key manager, a remote key manager, or any other possible source. The call from the cache tier 204 to the encryption process 208 just asks for the current key to decrypt the encrypted data 205. The source of the key and any management of the key is not of any concern to the cache tier, as the cache tier only determines whether or not the key be used to write the data. The encryption layer has abstracted all of the management functions out of the cache tier and just provides a valid key. At read, the cache tier queries the encryption process 208 as to whether the current key is usable, i.e., not compromised or destroyed. In this manner, the key management is abstracted at the encryption and active tier layers and out of the cache layer.

In an embodiment, each block of cache data being encrypted is pre-pended with a cryptographic header that is self-describing, and which includes details about the encryption algorithm, key attributes, initialization vector used for encryption, and length of the encrypted block. This header is self-contained to encapsulate all cryptographic attributes of the block needed by the cryptographic management process 120.

Process 120 provides dynamic key adaptation and data validity for encrypting the data in the cache tier 204. The cryptographic header for each encrypted block contains the data encryption key identifier used for encrypting that specific block. As shown in FIG. 3, the key identifier is an index to the key table 308 managed by lower layers of filesystem, such as the active tier 304. This ensures that any underlying changes in the key-management system are not managed from the cache layer. These changes may include rotation of the data encryption key used for at rest data encryption, changes in data encryption key types based on the key-manager in use in the data storage system, and other similar changes.

Changes in the data encryption key in the storage system or a change in the key-manager, which indicates a different data encryption key type, will result in the corresponding data encryption key being used for cache block encryption and is stored in the encryption header by lower layers of filesystem during a read/prefetch request. This ensures that there is no need to sweep and find blocks of the cache layer to handle individual blocks of data. Decryption of the encrypted cache block can also happen independently based on the data encryption key in the header. The same applies for the cryptographic algorithm used for encryption and any changes to the encryption algorithm in use.

The data checksum in the cryptographic header provides an additional mechanism to verify the validity of decrypted cache data to ensure cached data served is always verified. If veracity of decrypted cache data cannot be validated, then that cache block is evicted from cache based on the error from the decryption interface.

Figure 4:
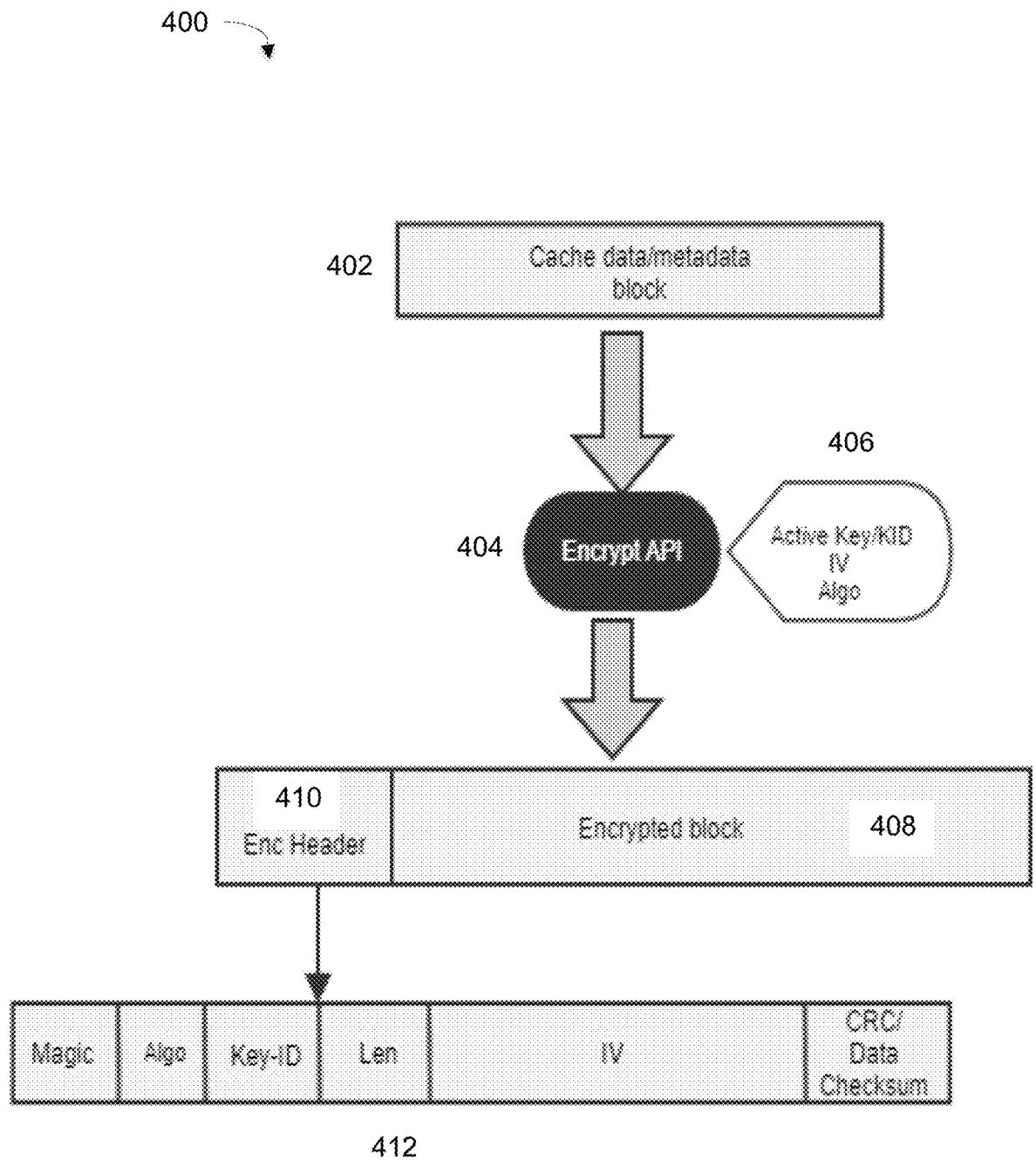
FIG. 4 illustrates a key encryption process by a cryptographic key manager, under some embodiments.

FIG. 4 illustrates an encryption process by a cryptographic key manager, under some embodiments. As shown in diagram 400, a data or metadata block 402 to be cached is encrypted by a defined encryption process that may be accessed by an encryption application programming interface (API) 404. The encryption API uses certain relevant parameters 406, such as encryption algorithm, initialization vector (IV), active key identifier (KID), and other possible parameters. The encrypted data forms an encrypted data block 408, to which is prepended an encryption header 410, as described above. In an embodiment, the encryption header 410 comprises a cache data/metadata block header 412 that includes a number of data elements, including a magic value, the encryption algorithm (Algo), the current or active key ID, the length (LEN) of the encrypted block, the initialization vector (IV) used for encryption, and a checksum for cyclic redundancy check (CRC). Other data elements may also be included depending on system configuration and requirements, such additional data or metadata information, key attributes, and so on. In general, a 'magic value' is a fixed value that is utilized for integrity checks. Any appropriate encryption algorithm may be used, such as AES, DES, and so on.

After the encryption process 400, the cache contains the original data block 402 as encrypted by the key used by the encryption API 404 and indexed by the encryption header 410. This encrypted information can then be decrypted in the cache through the use of the same key. In an embodiment, the cryptographic key management process 120 uses symmetric key encryption where a single secret key is used for both encryption and decryption. For decryption, the cache tier requests the current/active key from the encryption process using the key index and key table in the active tier, and then invokes the appropriate decryption algorithm to decrypt the data. The use of the key index and key table means that no keys are stored in the cache tier, the cache stores only the key IDs as indexes to the key table which stores the keys in the active tier. Changes to keys, such as through rotation, marking as compromised/destroyed, and so on, are thus passed to the cache tier through the index calls to the key table in the active tier, and no keys need to be stored and processed in the cache tier.

Figure 5:
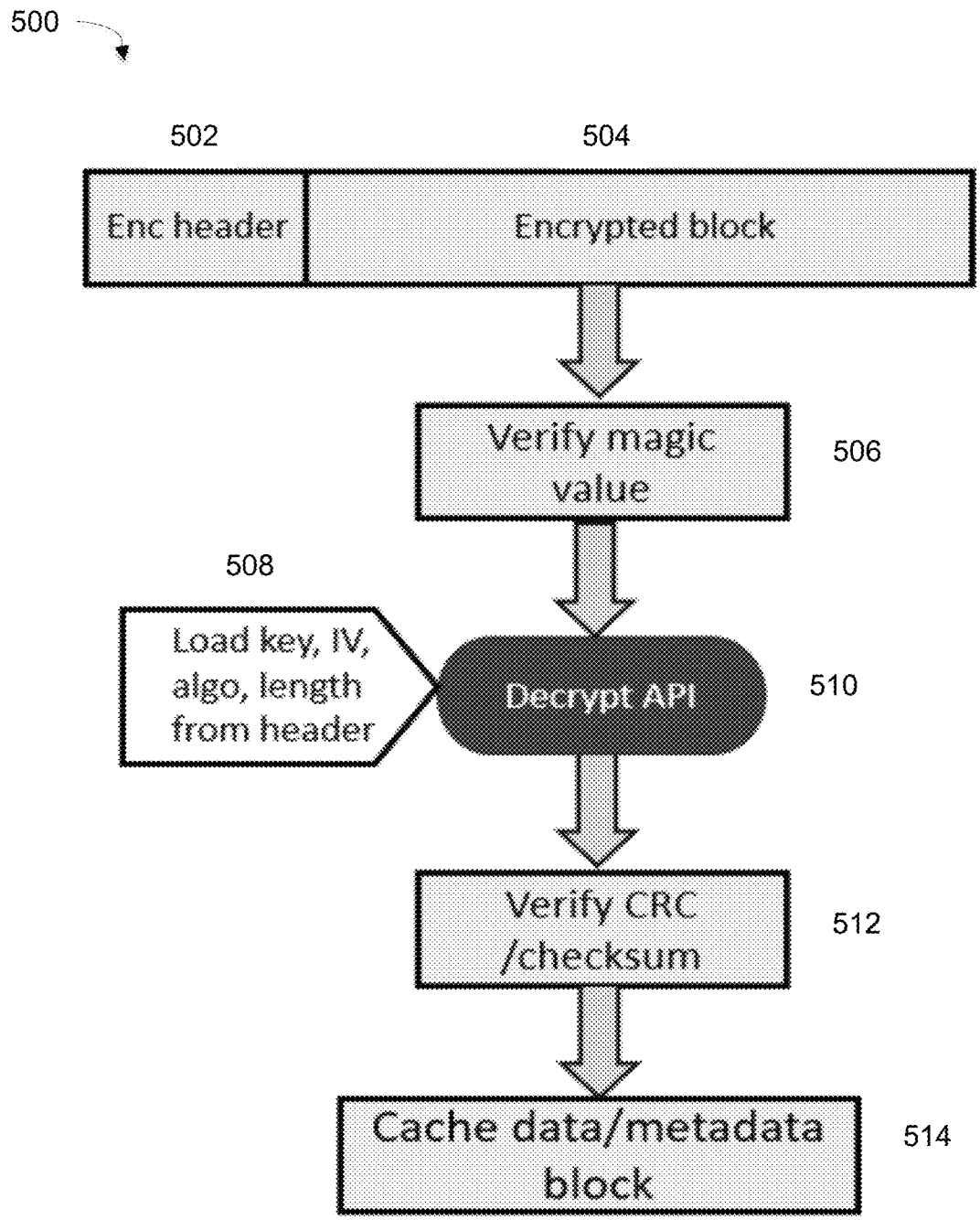
FIG. 5 illustrates an decryption process by a cryptographic key manager, under some embodiments.

FIG. 5 illustrates an decryption process by a cryptographic key manager, under some embodiments. As shown in diagram 500, after a data block is encrypted as an encrypted block 504, the following parameters are kept in the encryption header 502: (1) encryption algorithm that was used to encrypt the data, (2) index of encryption key used for encryption, (3) length of encrypted block, (4) initialization vector which was used while encrypting data, (5) magic value, and (6) CRC checksum of pre-encrypted data, which is kept to check for data integrity later at the time of decryption. At the time of decryption, the encryption key from the key table corresponding to the key index stored in the encryption header will be loaded. Along with it all other parameters which were used at the time of encryption will be provided to decryption engine. Before decryption, the magic value is examined verified to make sure data is intact, 506. The decryption algorithm is then invoked using a decryption API 510, which uses the encryption header information 508, described above. After decryption is done, the CRC checksum will be looked into for an additional data integrity check, 512. The decrypted cache data/metadata block 514 is then available.

Figure 6:
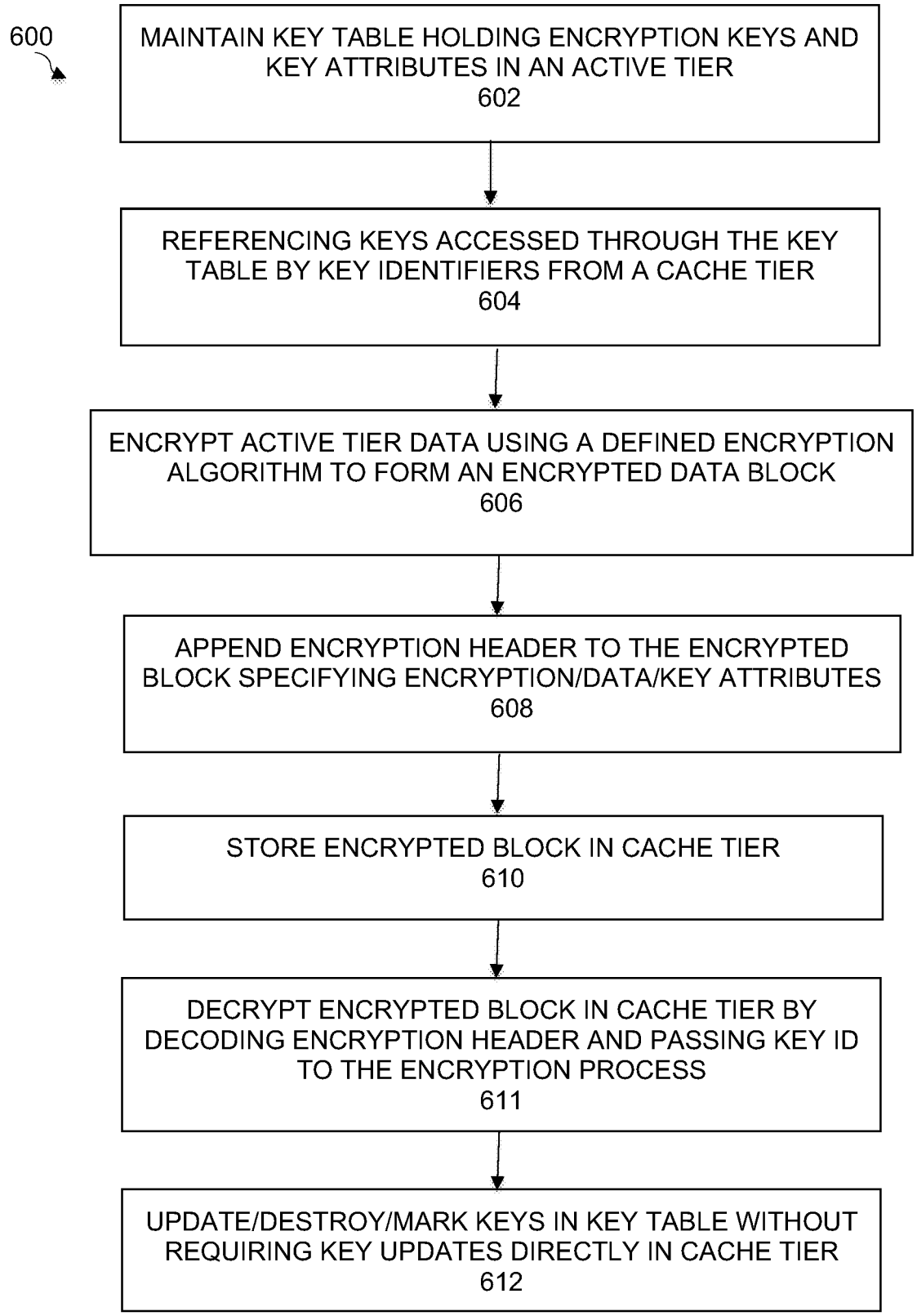
FIG. 6 is a flowchart illustrating a dynamic and agnostic cryptographic key management process for cached data and metadata, under some embodiments.
Figure 7:
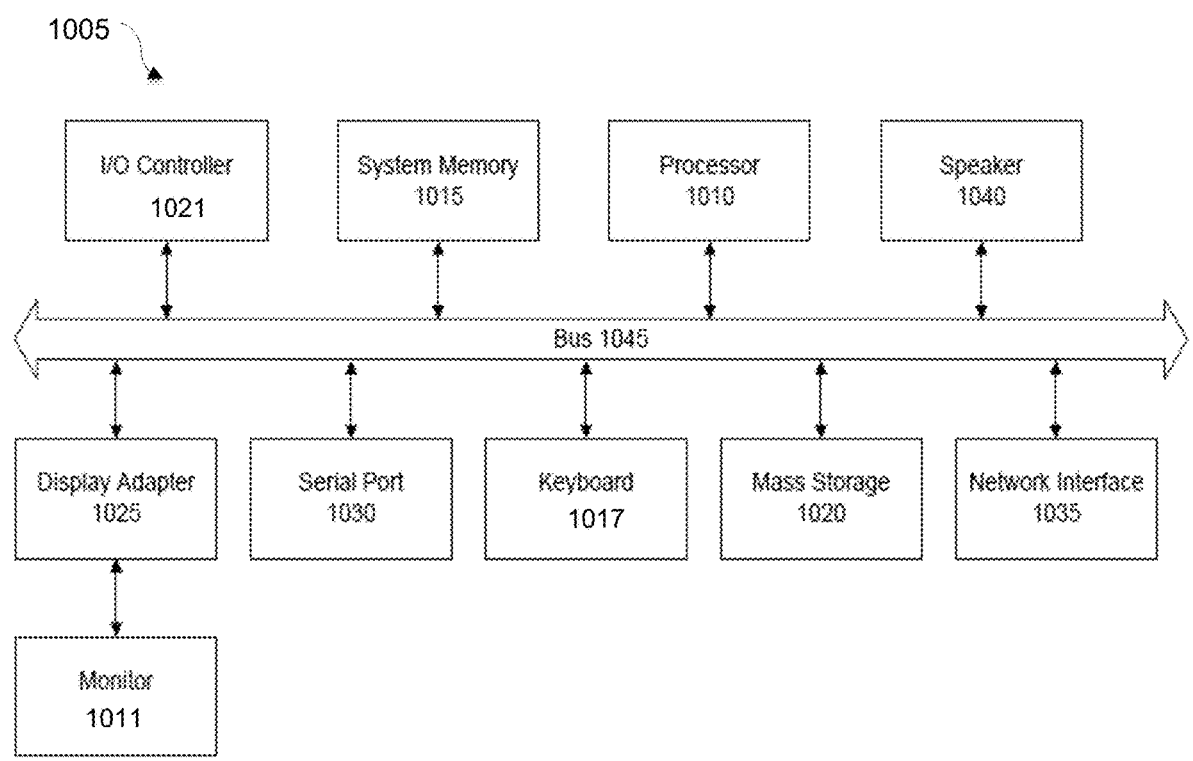
FIG. 7 is a system block diagram of a computer system used to execute one or more software components of the described systems and processes, under some embodiments.

FIG. 6 is a flowchart illustrating a dynamic and agnostic cryptographic key management process for cached data and metadata, under some embodiments. As shown in FIG. 6, process 600 begins by maintaining in the active tier a key table in holding encryption keys and key attributes, 602. The encryption keys are accessed from or through the key table by key identifiers provided from the cache tier, 604. Data and/or metadata to be cached is encrypted using a defined encryption algorithm, such as accessed through encrypt API 404 to form an encrypted data block, 606. The key manager process 120 appends an encryption header to the encrypted block specifying key and data attributes including the encryption key ID (KID), 608. The encrypted block is then stored in the cache tier, 610. The encrypted block can then be decrypted in the cache tier by decrypting the encryption header and passing the key identifier back to the encryption process, 611. The encryption process check whether or not the key identifier indexes a valid key or a key that is marked as destroyed or compromised. If valid, the key is used to decrypt the data, otherwise the key is not used, and the encrypted data is subsequently evicted from the cache tier under normal cache operations.

The key management utilizing the key table and KID index mechanism eliminates the need to store or replicate actual encryption keys in the cache tier, and allows for easy update, destruction, or marking of compromised keys in the key table of the active tier, 612. Any key changes are thus committed in the active tier and the cache tier only needs to send and receive key ID information through the header of the encrypted data block. Any changes to the encryption keys is made to the active tier only and not to the cache tier, thus isolating the cache tier from any direct key management processes.

Compromised Key Processing

In traditional key-management systems for user data, when a data encryption key is compromised and can no longer be used for encryption, all at rest data encrypted with that key must be decrypted and re-encrypted with a newer data encryption key to ensure data security is not compromised. This sweep and convert process can be a long, drawn-out procedure especially in large data storage systems often involving multiple start and stop cycles based on the current workloads in the data storage system. In current systems, since the cache volume has encrypted self-contained granular units of data, this process can be bypassed by dynamic on-demand handling of each cached block. On access, the data encryption key-attributes in the cryptographic header are used to validate the data encryption key and decryption of that specific block is failed. This failure when piped up to the cache layer triggers the eviction of just that cached block on access. On the next access, that block can again be read (or prefetched), encrypted using the current data encryption key and be inserted into the cache layer again. The cached block can also be evicted due to the standard eviction algorithm used by the cache which also ensures that individual blocks of the entire cache data set do not need to be scanned in the event of any compromise of the data encryption key.

In this manner, the system avoids sweeping the cache volume to detect segments encrypted with compromised/destroyed keys. The concerned data segments are evicted optimally at the time of next attempt to decrypt the segment. The decryption of such a segment is failed in such a way that the segment is evicted.

Embodiments of the processes and techniques described above can be implemented on any appropriate data storage or backup system operating environment or file system, or network server system. Such embodiments may include other or alternative data structures or definitions as needed or appropriate.

The network of FIG. 1 may comprise any number of individual client-server networks coupled over the Internet or similar large-scale network or portion thereof. Each node in the network(s) comprises a computing device capable of executing software code to perform the processing steps described herein. FIG. 10 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of decrypting data stored in cache memory, comprising:
    encrypting data from an active tier using an encryption process employing an encryption key to generate an encrypted data block;
    associating an encryption header with the encrypted data block, the encryption header being self-contained to encapsulate all cryptographic attributes of the encrypted data block with details about the encryption process, key attributes, initialization vector, and encrypted block length, and including a key identifier as an index to the encryption key, wherein the encryption key is accessed through a key table maintained in the active tier;
    storing the encrypted data block in a cache tier;
    providing the key identifier in the encryption header to the encryption process; and
    referencing, in the cache tier, the provided key identifier to access the encryption key;
    loading, into the cache tier, the encryption key referenced by the index from the key table along with the cryptographic attributes in the encryption header;
    passing the key identifier back to the encryption process for verification that the key identifier indexes a valid key;
    decrypting, upon verification and in the cache tier, the encrypted data block using a decryption algorithm that uses the cryptographic attributes; and
    detecting failure of the encryption key or decrypting step by transmitting the failure to the cache tier to trigger eviction of the encrypted data block from the cache tier to thereby prevent the need for a sweep and convert process to maintain security of data in the active tier.

2. The method of claim 1 further comprising passing changes to the encryption key using a key rotation process through an index call to the key table in the active tier to prevent the need to store and process encryption keys in the cache tier.

3. The method of claim 2 wherein the encryption header further comprises a checksum for cyclic redundancy checking of the encrypted block.

4. The method of claim 1 further comprising:
    checking if the key identifier provided by the cache tier identifies a key marked as compromised or invalid;
    allowing decryption if the key identifier provided by the cache tier identifies a current valid and unmarked key; and
    not allowing decryption if the key identifier provided by the cache tier identifies a marked key.

5. The method of claim 4 wherein if the key identifier provided by the cache tier identifies a marked key further comprising, the method further comprises evicting the encrypted data block from the cache tier under normal cache operations.

6. The method of claim 1 wherein the encryption process comprises an executable program accessed through an encryption application programming interface (API), and the decryption process comprises an executable program accessed through a decryption API.

7. The method of claim 1 wherein the active tier comprises hard disk device (HDD) storage storing unencrypted data for use by one or more applications utilizing the cache tier.

8. The method of claim 7 wherein the cache tier comprises memory temporarily storing data and metadata for use by the applications.

9. The method of claim 8 wherein the cache tier comprises solid state device (SSD) storage featuring input/output (I/O) access speeds in excess of the HDD storage and that has a lower data retention lifespan compared to the HDD storage.

10. The method of claim 9 wherein the active tier and cache tier both comprise part of a deduplication backup process executed by a data storage server running a Data Domain file system (DDFS), and wherein the encrypted data comprises tree-organized segments deduplicated by a DDFS deduplication process.

11. A computer implemented method of decrypting data stored in cache memory, comprising:
    encrypting a data block stored in an active tier comprising Hard Disk Drive (HDD) storage by invoking an encryption algorithm using an encryption key managed by a key manager to form an encrypted data block;
    pre-pending an encryption header to the encrypted data block, the encryption header comprising a key identifier for the encryption key, an identifier of the encryption algorithm, an initialization vector used for encryption, and the length of the encrypted block;
    storing the encrypted data block in a cache tier comprising Solid State Device (SSD) memory for later decryption;
    providing the key identifier in the encryption header to the cache tier;
    loading, into the cache tier, the encryption key referenced by the index from the key table along with the cryptographic attributes in the encryption header;
    passing the key identifier back to the encryption process for verification that the key identifier indexes a valid key;

decrypting, upon verification and in the cache tier, the encrypted data block using a decryption algorithm that uses the cryptographic attributes;

detecting failure of the encryption key or decrypting step by transmitting the failure to the cache tier to trigger eviction of the encrypted data block from the cache tier to thereby prevent the need for a sweep and convert process to maintain security of data in the active tier; and updating the encryption key by marking a previous encryption key as compromised or invalid.

12. The method of claim 11 further comprising maintaining a key table indexed by corresponding key identifiers in the active tier, the key table comprising data fields for corresponding key and data attributes including a marking a status of the stored keys.

13. The method of claim 12 further comprising
checking if the key identifier provided by the cache tier identifies a key marked as compromised or invalid;
allowing decryption if the key identifier provided by the cache tier identifies a current valid and unmarked key; and
not allowing decryption if the key identifier provided by the cache tier identifies a marked key.

14. The method of claim 13 wherein if the key identifier provided by the cache tier identifies a marked key further comprising, the method further comprises evicting the encrypted data block from the cache tier under normal cache operations.

15. The method of claim 11 wherein the encryption header further comprises a checksum for cyclic redundancy checking of the encrypted block, and further comprising passing changes to the encryption key through a key rotation process through an index call to the key table in the active tier to prevent the need to store and process encryption keys in the cache tier.

16. A system decrypting data stored in cache memory, comprising a hardware processor executing program instruction stored in a memory to perform processing steps comprising:
storing in an active tier data to be cached for one or more applications;
encrypting data from the active tier using an encryption process employing an encryption key to generate an encrypted data block;
maintaining a key table in the active tier and configured to store key and data attributes indexed through a valid encryption key identifier;
associating an encryption header with the encrypted data block using a key manager, wherein the encryption header is self-contained to encapsulate all cryptographic attributes of the encrypted data block with details about the encryption process, key attributes, initialization vector, and encrypted block length, and includes a key identifier as an index to the encryption key, wherein the encryption key is accessed through the key table;
storing in a cache tier the encrypted data block for decryption in the cache tier after providing the key identifier in the encryption header to the encryption component;
loading, into the cache tier, the encryption key referenced by the index from the key table along with the cryptographic attributes in the encryption header, and passing the key identifier back to the encryption process for verification that the key identifier indexes a valid key;
decrypting, upon verification and in the cache tier, the encrypted data block using the cryptographic attributes; and
detecting failure of the encryption key or decrypting step by transmitting the failure to the cache tier to trigger eviction of the encrypted data block from the cache tier to thereby prevent the need for a sweep and convert process to maintain security of data in the active tier.

17. The system of claim 16 wherein the encryption header comprises a checksum for cyclic redundancy checking of the encrypted block, and wherein the processing component further passes changes to the encryption key through a key rotation process through an index call to the key table in the active tier to prevent the need to store and process encryption keys in the cache tier.

18. The system of claim 17 wherein the key manager checks if the key identifier provided by the cache tier identifies a key marked as compromised or invalid, and allows decryption if the key identifier provided by the cache tier identifies a current valid and unmarked key, or does not allow decryption if the key identifier provided by the cache tier identifies a marked key.

19. The system of claim 18 wherein if the key identifier provided by the cache tier identifies a marked key, the system evicts the encrypted data block from the cache tier under normal cache operations.

20. The system of claim 16 wherein the active tier and cache tier both comprise part of a deduplication backup process executed by a data storage server running a Data Domain file system (DDFS).

* * * * *